(12) United States Patent
Malvasi et al.

(10) Patent No.: US 7,101,925 B2
(45) Date of Patent: Sep. 5, 2006

(54) PROCESS FOR PREPARING FLUOROPOLYMER DISPERSIONS

(75) Inventors: Marco Malvasi, Alessandria (IT); Valeri Kapeliouchko, Alessandria (IT)

(73) Assignee: Solvay Solexis, S.p.A., Milan (IT)

( * ) Notice: Subject to any disclaimer, the term of this patent is extended or adjusted under 35 U.S.C. 154(b) by 18 days.

(21) Appl. No.: 11/033,276

(22) Filed: Jan. 12, 2005

(65) Prior Publication Data

US 2005/0189299 A1    Sep. 1, 2005

(30) Foreign Application Priority Data

Jan. 14, 2004    (IT)    ............... MI2004A0031

(51) Int. Cl.
| | |
|---|---|
| C08J 3/00 | (2006.01) |
| C08F 220/04 | (2006.01) |
| C08F 12/20 | (2006.01) |
| C08F 26/00 | (2006.01) |
| C08K 3/20 | (2006.01) |

(52) U.S. Cl. .............. 524/379; 524/544; 524/458; 526/242; 526/248

(58) Field of Classification Search ............ 524/379
See application file for complete search history.

(56) References Cited

U.S. PATENT DOCUMENTS

| | | | |
|---|---|---|---|
| 2,559,752 A | | 7/1951 | Berry et al. |
| 3,037,953 A | | 6/1962 | Marks et al. |
| 3,271,341 A | | 9/1966 | Garrison, Jr. et al. |
| 3,301,807 A | | 1/1967 | Hoashi et al. |
| 3,536,643 A | | 10/1970 | Stryker et al. |
| 3,704,272 A | | 11/1972 | Holmes et al. |
| 4,369,266 A | * | 1/1983 | Kuhls et al. ............. 523/332 |
| 4,380,618 A | | 4/1983 | Khan et al. |
| 4,864,006 A | | 9/1989 | Giannetti et al. |
| 4,990,283 A | | 2/1991 | Visca et al. |
| 5,789,508 A | | 8/1998 | Baker et al. |
| 6,136,893 A | * | 10/2000 | Yamashita et al. ........ 523/310 |
| 6,297,334 B1 | | 10/2001 | Marchese et al. |
| 6,479,591 B1 | | 11/2002 | Kapeliouchko et al. |
| 6,518,352 B1 | | 2/2003 | Visca et al. |
| 6,576,703 B1 | | 6/2003 | Kapeliouchko et al. |
| 6,825,250 B1 | * | 11/2004 | Epsch et al. ............. 523/310 |
| 6,833,403 B1 | * | 12/2004 | Bladel et al. ............ 524/458 |
| 6,861,466 B1 | * | 3/2005 | Dadalas et al. .......... 524/544 |
| 2003/0153674 A1 | | 8/2003 | Visca et al. |
| 2003/0220442 A1 | | 11/2003 | Epsch et al. |

FOREIGN PATENT DOCUMENTS

| | | |
|---|---|---|
| DE | 100 18 853 A1 | 10/2001 |
| EP | 0 194 690 A2 | 9/1986 |
| EP | 1 155 055 B1 | 4/2003 |
| EP | 1 526 142 A1 | 4/2005 |
| EP | 1 538 177 A1 | 6/2005 |
| WO | 03/051988 A2 | 6/2003 |

OTHER PUBLICATIONS

"Nonionic Surfactants"; Martin J. Schick et al; *Marcel Dekker Inc.*; 1967; pp. 76-85, pp. 102-125, 138-141, and pp. 570-583.
"Encyclopedia of Chemical Technology"; Kirk Othmer; *J. Wiley & Sons*; 1995; vol. 14; pp. 737-783.
"Encyclopedia of Industrial Chemical Analysis"; *Interscience Publishers*; New York; NY; 1971; vol. 1: pp. 339-340 Not Available.
European Search Report

* cited by examiner

*Primary Examiner*—David W. Wu
*Assistant Examiner*—Ives Wu
(74) *Attorney, Agent, or Firm*—ArentFox PLLC

(57) ABSTRACT

A process to substantially remove the fluorinated anionic surfactants comprising the following steps:
a) addition to a fluoropolymer dispersion of a nonionic surfactant, in an amount in the range 1.5%–25% by weight, referred to the fluoropolymer weight;
b) addition to the dispersion of a salt, soluble in water and not giving precipitates in the dispersion under the use conditions;
c) contact of the dispersion with a basic anionic exchanger;
d) separation of the dispersion from the basic anionic exchanger;
before step d) the dispersion being filterable on a 180 micrometer net and successively on a 10 micrometer net.

35 Claims, No Drawings

PROCESS FOR PREPARING FLUOROPOLYMER DISPERSIONS

The present invention relates to a process for preparing aqueous dispersions of fluoropolymers substantially free from fluorinated surfactants, in particular fluorinated ionic surfactants.

More specifically the present invention relates to a process for preparing aqueous dispersions of fluoropolymers substantially free from perfluorooctanoate in the form of acid or its salts.

With aqueous dispersions of fluoropolymers substantially free from fluorinated surfactants it is meant that the fluorinated surfactant content referred to the fluoropolymer weight is lower than 100 ppm, in particular lower than 50 ppm, more specifically lower than 5 ppm.

It is well known in the prior art that for the production of fluorinated polymers there are two different polymerization procedures: the suspension polymerization and the emulsion polymerization. In the suspension polymerization polymer granules having millimetric sizes are obtained. In the emulsion polymerization a colloidal aqueous dispersion is obtained having particle diameters from some nanometers, generally 10 nm, to hyndreds nanometers, from 100 nm to 400 nm. The emulsion polymerization process of fluoropolymers is carried out with a mild stirring and in the presence of surfactants not acting as chain transfer agents to avoid to obtain fluoropolymes having a low molecular weight and therefore having poor mechanical properties. Said surfactants are called non telogenic surfactants, see, for example, U.S. Pat. No. 2,559,752. Perfluoroalkanoic acid salts, in particular the ammonium salt and/or alkaline metal salts of the perfluorooctanoic acid, hereinafter referred to as PFOA, are industrially very often used. Other (per)fluorinated anionic surfactants are also used, see for example U.S. Pat. Nos. 3,271,341, 4,380,618, 4,864,006, 5,789,508. The PFOA is the most industrially used surfactant in the emulsion polymerization since it is not telogen, thus allowing to obtain fluorinated polymer dispersions having a high molecular weight, and it allows to obtain stable dispersions for long periods of time. It is also known that in the applications of fluoropolymer dispersions, as coating or in the impregnation of glass fibers, said fluorinated surfactants can reach the environment, for example by the washing effluents, or disperse in the atmosphere during the drying and/or sintering steps. However some of said surfactants have been classified as harmful for the environment and are characterized by a low bioelimination rate from the human body. For example, the PFOA seems to belong to the surfactants particularly harmful for the environment and with long residence times in men. Therefore there is a request from the users of fluoropolymer dispersions substantially free from fluorinated anionic surfactants, and in particular free from PFOA.

The fluoropolymer dispersions are obtained from the emulsion polymerization process with a fluorinated polymer concentration in the range 20%–35% by weight referred to 100 parts by weight of the dispersion.

The fluoropolymer dispersions obtained from the polymerization process can be subjected to post-treatments to obtain concentrated fluoropolymer dispersions, even up to 75% w/w. The concentration processes can be obtained, for example, by a decantation process as described, for example, in U.S. Pat. Nos. 3,037,953, 3,704,272 and 3,301,807. Another concentration process of fluoropolymer dispersions is the so called ultrafiltration process as described, for example, in U.S. Pat. Nos. 4,369,266 and 6,136,893. In U.S. Pat. No. 4,369,266 it is described a variant of the ultrafiltration process allowing to obtain aqueous dispersions of fluoropolymers substantially free from fluorinated anionic surfactant, for example PFOA. The process is based on the dialysis of the fluoropolymer dispersions and the permeate is purified from PFOA by using anionic exchange resins. This process can be industrially carried out. The drawback is that the dialysis process is slow, in particular to obtain fluoropolymer dispersions having a very low PFOA content, lower than 10 ppm referred to the polymer weight. It is also known a process for obtaining polymeric dispersions substantially free from PFOA by direct contact of the stabilized dispersion with anionic exchange resins. See for example U.S. Pat. No. 3,536,643, EP 1,155,055, WO 03/051988, U.S. P 2003/0220442.

As described in EP 1,155,055 and in WO 03/051988, said process has the drawback that its accomplishment out on already concentrated dispersions, with a solid content up to 70%, becomes difficult. In the above patents no purification examples from fluorinated anionic surfactants of PTFE dispersions having a solid content higher than 52.5% by weight are reported. Tests carried out by the Applicant, see the comparative Examples, have shown that this process of the prior art is not industrially accomplishable at high fluoropolymer concentrations with an acceptable productivity.

In patent application DE 100 18 853 it is described a process for obtaining dispersions substantially PFOA free by distillation of the dispersion brought to pH between 1 and 3. Said process has the drawback to involve a strong dispersion destabilization and a high probability of coagulum formation. Moreover there is the drawback that a remarkable amount of foam forms creating problems for the industrial process achievement.

The fluoropolymer dispersions obtainable by an emulsion or microemulsion polymerization process, generally have the following characteristics:
 particle diameter from 10 nm to 400 nm, preferably from 20 nm to 300 nm;
 fluoropolymer concentration from 10% to 45% by weight, preferably from 20% to 35%;
 amount of fluorinated anionic surfactant in the range 800 ppm-200,000 ppm, preferably 1,200 ppm-6,000 ppm referred to the polymer weight.

From the industrial point of view, the polytetrafluoroethylene (PTFE) dispersions obtainable by an emulsion polymerization process typically have an average particle diameter from 180 nm to 400 nm, preferably from 200 nm to 300 nm; still more preferably from 220 nm to 280 nm. The amount of fluorinated anionic surfactant is in the range from about 2,500 ppm to about 5,000 ppm, preferably from 3,000 ppm to 4,000 ppm, referred to the polymer weight. Processes to obtain polytetrafluoroethylene (PTFE) dispersions having a diameter in the range 10 nm–100 nm, preferably 20 nm–80 nm, still more preferably 30 nm–70 nm, for example by microemulsion polymerization, are known in the prior art. See for example U.S. Pat. No. 6,297,334. Said dispersions typically contain an amount of fluorinated anionic surfactant in the range from about 800 ppm to about 200,000 ppm, preferably from 1,200 ppm to 40,000 ppm, referred to the polymer weight.

For the use in industrial applications, said dispersions are concentrated, for example by heating in the presence of a nonionic surfactant or by ultrafiltration, to a solid content up to 75% of fluoropolymer, see the above references.

The Applicant has found that by using in a continuous and in a discontinuous way the process for obtaining polymeric dispersions substantially PFOA free by direct contact of the stabilized dispersion with anionic exchange resins, as described in U.S. Pat. No. 3,536,643, EP 1,155,055, WO 03/051988, the following drawbacks are noticed:

for the dispersions obtained by an emulsion polymerization process having particles with a diameter comprised between 220 nm and 280 nm, when the fluoropolymer content in the dispersion is high, for example of about 65% by weight or higher, the process is not industrially feasible with acceptable productivity, since the dispersion requires very long filtration times (see the filtration test as defined below) and, when the process is continuously carried out, the column block takes place;

in the dispersions obtained by a microemulsion polymerization process, wherein the fluoropolymer particle diameter ranges from 10 nm to 100 nm, the prior art process is technically unfeasible already at low concentrations, owing to the above inconveniences. This occurs for example starting from a solid content in the dispersion of the order of 30% by weight in the case of particles having an average diameter of 20 nm; of about 40% by weight in the case of particles having an average diameter of 50 nm; of the order of 50% by weight in the case of particles having an average diameter of 80 nm; see the Examples.

The need was felt of a process achievable by ionic exchange resins, being applicable to fluoropolymer dispersions having a high solid content, with high volumetric productivity independently from the fluoropolymer concentration in the dispersion to be treated, in particular to dispersions having:

concentrations higher than 65% by weight and containing particles with an average diameter from 180 nm to 400 nm, preferably from 200 nm to 300 nm; still more preferably from 220 nm to 280 nm;

concentrations higher than 50% by weight and containing particles having an average diameter higher than 70 nm up to 100 nm;

concentrations higher than 40% by weight and containing particles with an average diameter higher than 30 nm up to 70 nm;

concentrations higher than 30% by weight and containing particles with an average diameter between 10 nm and 30 nm;

said process being able to give fluoropolymer dispersions having the following properties:

substantially fluorinated anionic surfactant free;

industrially obtainable by a continuous or discontinuous process with a high volumetric productivity;

filterable on a 180 micrometer net and then on a 10 micrometer net in very short times (see hereinunder);

preferably, substantial absence of coagulum on the 10 micrometer net.

It has been found by the Applicant a process solving the above technical problem.

An object of the present invention is a process to substantially remove the fluorinated anionic surfactants comprising the following steps:

a) addition to a fluoropolymer dispersion of a nonionic surfactant, in an amount in the range 1.5%–25% by weight, preferably 2%–10% by weight, referred to the fluoropolymer weight;

b) addition to the dispersion of a salt soluble in water and not giving precipitates in the dispersion under the use conditions;

c) contact of the dispersion with a basic anionic exchanger;

d) separation of the dispersion from the basic anionic exchanger;

before step d) the dispersion being filterable on a 180 micrometer net and successively on a 10 micrometer net.

The dispersion filterability through the two filters is verified with the following test:

a dispersion aliquot of about 250 ml, obtained after the treatment with the anionic exchanger, is transferred into a cylindrical vessel equipped on the bottom with a circular section filter having a diameter of 3 cm with 180 micron mesh; the time necessary to filter the dispersion volume from the resins is measured;

the dispersion after filtration is transferred into a cylindrical vessel equipped on the bottom with a circular section filter having a diameter of 3 cm, with 10 micron mesh; the time necessary to allow the whole dispersion amount to cross the filter, is measured.

The dispersion satisfy the test when there are the following conditions together:

the time necessary to let pass the dispersion volume through the 180 micron mesh filter is lower than 10 seconds, preferably lower than 5 seconds;

the time necessary to let pass the dispersion volume through the 10 micron mesh filter is lower than 90 seconds.

The Applicant has found that the productivity of the industrial process carried out according to the invention process is very high. For example if the process was carried out on a column containing the anionic resins and having on the column bottom a filter formed by a 180 micron net, it is very important the time employed by the fluoropolymer dispersion to leave the column, the contact time of the dispersion with the anionic resins being equal. It has been surprisingly and unexpectedly found by the Applicant that the productivity for volume of handled dispersion of the invention process is independent from the fluoropolymer concentration in the dispersion to be treated. This fact represents a significant advantage from the industrial point of view, since the industrial process works under the same operating conditions with the dispersions having for example a fluoropolymer concentration of 20% w/w and of 70% w/w. In the case of the ionic exchange process according to the prior art the volumetric productivity (for handled volume) at a concentration for example of 20% w/w is remarkably higher than that of dispersions having a concentration of 70% w/w. In the latter case indeed the volumetric productivity of the process according to the prior art is substantially null.

The salt used in step b) of the invention process is preferably an alkaline metal salt. In particular the potassium or sodium salts are used. The salt amount ranges from 50 ppm to 1% by weight, preferably from 100 ppm to 1,000 ppm, referred to the dispersion weight.

In step b) also the ammonium salts can be used; in this case it is necessary to use higher salt amounts, from 300 ppm, preferably from 500 ppm, still more preferably from 700 ppm, to 1% by weight.

The fluoropolymer dispersion used in step a) comes from an emulsion or microemulsion polymerization process. The fluoropolymer concentration is from 10% to 45% by weight, preferably from 20% to 35%.

The amount of salt present in the fluoropolymer dispersion coming from the polymerization process is generally lower than 50 ppm, not considering the ammonium perfluorooctanoate industrially used for preparing the PTFE homopolymer or its copolymers. Generally said salt amounts derive from the initiator used in the polymerization reaction.

When the fluoropolymer dispersion used in the invention process derives from a concentration process using the ultrafiltration, the concentration of said above salts is lower than 50 ppm. When the fluoropolymer dispersion used in the invention process derives from a concentration process using clouding, the final salt concentration is generally of the order of 200 ppm, the industrially used salt being an ammonium salt. The added maximum salt amount must be aanyhow such not to compromise the dispersion stability, i.e. not to cause the dispersion coagulation.

Step c) can be carried out by a continuous or a discontinuous process, preferably by a discontinuous process. For example step c) can be carried out by addition of the anionic exchanger, under the form of granules having sizes of about 300–400 micrometers. The added amount is generally of the order from 1% to 10% by weight with respect to the dispersion weight. The invention process in this case is carried out in a tank equipped with stirring, the substantial reduction of the perfluorooctanoate is obtained in short times, generally of the order from 2 to 24 hours. Generally this type of process is carried out in a discontinuous way.

Another type of embodiment of the invention process is that to let pass the fluoropolymer dispersion on a column filled with the ionic exchange resin of step c). Generally the contact time of the fluoropolymer dispersion with the ionic exchange resin is of about one hour. This type of embodiment is preferably carried out in a continuous way.

After step c) the dispersion must be filterable on a 180 micrometer net and subsequently on a 10 micrometer net in the above times to have a high productivity. Preferably in this step there is a substantial absence of coagulum on the 10 micrometer net. This represents an advantage since there are no fluoropolymer losses during the invention process.

The step d) of the dispersion separation from the basic anionic exchanger is carried out with the well known separation techniques of a solid from a liquid. The decantation/flotation or the filtration technique can be mentioned. Generally the filtration is carried out on a 180 micrometer net. If the process is in a discontinuous way, step d) is preferably carried out by filtration.

The process of the present invention is generally achievable at temperatures from 5° C. to 45° C.

The fluoropolymer dispersions used in the invention process generally have an acid pH from 2 to 4. The concentrated fluoropolymer dispersions generally have a pH from 2 to 4. If desired, dispersions having a basic pH, for example between 7 and 9, for example by adding ammonia, can also be used. It is to be noticed that the addition of a base to bring the pH to 7–9 is generally unnecessary since with the invention process also starting from pH 2–4 the final pH is higher than 7.

The Applicant has surprisingly and unexpectedly found that, if step b) (addition of salts) is not carried out, no filterable dispersions are obtained when fluoropolymer dispersions having a high dry content, generally about 65% by weight or higher, even operating at pH 7–9, are used. See the comparative Examples.

As said, with the process of the present invention aqueous dispersions of fluoropolymers substantially fluorinated anionic surfactant free, in particular perfluorooctanoate in the form of acid or its salts, are obtained. With aqueous dispersions of fluoropolymers substantially free from fluorinated surfactants it is meant that the content of fluorinated surfactants, referred to the fluoropolymer weight, is lower than 100 ppm, in particular lower than 50 ppm, more particularly lower than 5 ppm.

It has been surprisingly and unexpectedly found by the Applicant that with the process of the present invention it is possible to obtain dispersions substantially anionic fluorinated surfactant free in a wide range of fluoropolymer concentration, for example from 20%, preferably from 30%, up to 75% by weight of dry product.

The invention process is applicable to fluoropolymer dispersions having a high solid content, also with high productivity, in particular to dispersions having: concentrations higher than 65% by weight and containing particles having an average diameter from 180 nm to 400 nm, preferably from 200 nm to 300 nm; still more preferably from 20 nm to 280 nm; concentrations higher than 50% by weight and containing particles having an average diameter higher than 70 nm, up to 100 nm; concentrtions higher than 40% by weight and containing particles having an average diameter higher than 30 nm, up to 70 nm; concentrtions higher than 30% by weight and containing particles having an average diameter between 10 nm and 30 nm.

The invention process allows to accomplish an industrial process having a high productivity.

The invention dispersions, having also a high solid content, can therefore be used for preparing monomodal or bi- or multimodal fluoropolymer dispersions. For example the bimodal dispersions contain a fluoropolymer amount, having average particle sizes between 180 and 400 nm, comprised between 80% and 95% by weight on the total solid, the complement to 100% being formed of fluoropolymer having average particle sizes between 10 nm and 100 nm. When fluoropolymer dispersions, preferably polytetrafluoroethylene (PTFE) or TFE copolymers as defined below, having an average particle diameter from 180 nm to 400 nm, are used, they are preferably used from 200 to 300 nm, still more preferably from 220 nm to 280 nm; for the fluoropolymer dispersions having average particle diameter between 10 nm and 100 nm, they are preferably used between 20 nm and 80 nm, still more preferably between 30 nm and 70 nm.

The nonionic surfactants used in step a) of the process of the present invention are known in the prior art. The book "Nonionic surfactants", ed. M. J. Schick, Marcel Dekker 1967, pages 76–85 and 103–141 can for example be mentioned. Preferably the nonionic surfactants used in the process of the present invention are polyethoxylated alcohols and polyethoxylated alkylphenols, which can contain one or more propylene oxide units.

The following surfactants are those still more preferred:
Triton®X100 (Dow), having formula:

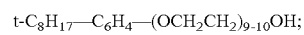

Tergitol®TMN100x (Dow), having formula:

Antarox®863 (Rhodia), having formula:

Rhodasurf®870 (Rhodia), having formula:

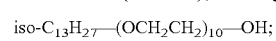

Genapol®X080 (Clariant), having formula:

In the process of the present invention mixtures of the above described nonionic surfactants can be used.

The salts usable in step b) are inorganic or organic. The alkaline metal salts, in particular potassium and sodium salts are preferred. The preferred anions of the salts usable in the process of the present invention are among those inorganic: nitrate, chlorate, sulphate, chloride, carbonate, fluoride, sulphite, phosphate; among those organic: acetate, oxalate. For exemplificative purposes the following salts are mentioned: potassium sulphate, sodium chloride, potassium nitrate, potassium oxalate.

Among the anionic exchange resins usable in step c) of the process of the present invention, the anionic exchange resins described in "Kirk-Othmer—Encyclopedia of Chemical Technology", vol. 14, pages 737–783, J. Wiley & Sons, 1995, can be mentioned. Among the preferred anionic exchange resins, the resins containing a tertiary or quaternary ammonium group can be mentioned. Among the preferred commercial resins, Amberjet®4400 H (Rohm&Haas) and Dowex®MSA 1-C (Dow) can be mentioned.

The polymerization processes to obtain the fluoropolymer dispersions usable in the process of the present invention, are the emulsion or microemulsion polymerization processes.

The emulsion polymerization processes are described in the following patents: U.S. Pat. Nos. 2,559,752, 4,380,618, 5,789,508, 6,479,591, 6,576,703 and in the patent application U.S. 2003/0153674.

The microemulsion polymerization processes are described in the following patents in the name of the Applicant: U.S. Pat. Nos. 4,864,006 and 6,297,334. The microemulsions usable in the microemulsion polymerization processes are described in U.S. Pat. Nos. 4,864,006 and 4,990,283.

The fluoropolymers of the dispersions which are used in the process of the present invention are for example:

tetrafluoroethylene (TFE) homopolymers and TFE copolymers with monomers having at least one unsaturation of ethylene type;

thermoprocessable fluoropolymers (from the melt) based on TFE such as PFA, MFA, FEP and ETFE;

VDF-based homopolymers and copolymers;

homopolymers and copolymers based on CTFE, for example PCTFE and E/CTFE copolymer;

VDF-based fluoroelastomers:
VDF/HFP, optionally containing TFE and/or vinylethers selected between pefluoroalkylvinylethers and/or perfluoroalkoxyalkylvinylethers; optionally containing hydrogenated olefins as ethylene and propylene;

TFE-based (per)fluoroelastomers:
TFE copolymers with vinylethers selected from perfluoroalkylvinylethers and/or perfluoroalkoxyalkylvinylethers; in particular TFE/PMVE, TFE/PEVE, TFE/PPVE;

TFE copolymers with hydrogenated olefins, preferably ethylene and/or propylene;

TFE and/or VDF amorphous and/or crystalline fluoropolymers containing dioxole rings having 5–7 atoms, in particular those obtained by copolymerization with (per)fluorodioxoles or with dienic monomers giving dioxole rings by cyclization.

The copolymers of tetrafluoroethylene (TFE) with monomers having at least one unsaturation of ethylene type comprise comonomers of hydrogenated and fluorinated type. The comonomer amount is preferably lower than 3% by weight, preferably lower than 1% to have non thermoprocessable copolymers (the so called modified PTFE).

Among the hydrogenated comonomers it can be mentioned ethylene, propylene, acrylic monomers, for example methylmethacrylate, (meth)acrylic acid, hydroxyethylenacrylate, styrene monomers, as, for example, styrene.

Among the fluorinated comonomers there can be mentioned:

$C_3$–$C_8$ perfluoroolefins, as hexafluoropropene (HFP);

$C_2$–$C_8$ hydrogenated fluoroolefins, as vinyl fluoride (VF), vinylidene fluoride (VDF), trifluoroethylene, $CH_2$=CH—$R_{f0}$ perfluoroalkylethylene, wherein $R_{f0}$ is a $C_1$–$C_6$ perfluoroalkyl;

$C_2$–$C_6$ chloro- and/or bromo- and/or iodo-fluoroolefins, as chlorotrifluoroethylene (CTFE);

$CF_2$=$CFOR_{f0}$ (per) fluoroalkylvinylethers (PAVE), wherein $R_{f0}$ is a $C_1$–$C_6$ (per)fluoroalkyl, for example $CF_3$, $C_2F_5$, $C_3F_7$;

$CF_2$=$CFOX_0$ (per)fluoro-oxyalkylvinylethers, wherein $X_0$ is a $C_1$–$C_{12}$ alkyl, or a $C_1$–$C_{12}$ oxyalkyl, or a $C_1$–$C_{12}$ (per)fluorooxyalkyl having one or more ether groups, for example perfluoro-2-propoxy-propyl;

fluorodioxoles, preferably perfluorodioxoles.

The preferred fluoropolymers of the dispersions obtainable by emulsion or microemulsion polymerization, usable in the process of the present invention, are the TFE copolymers or the PTFE homopolymers.

The initial dispersion can be mono- or bi- or multimodal. For the bi- and multimodal dispersions see for examples U.S. Pat. Nos. 6,576,703, 6,518,352 in the name of the Applicant.

The process of the present invention is characterized by a high productivity and substantially without fluoropolymer losses.

The fluoropolymer dispersions essentially fluorinated anionic surfactant free obtainable with the process of the present invention are characterized by a good stability to shear and can be used in the usual applications for this kind of compositions. The dispersions obtainable with the invention process, as such or formulated, can also be used for the coating of surfaces of organic and/or inorganic polymers, of metals or ceramics; for the glass fiber impregnation, the cast film production, for the additivation of polymers or inorganic materials, etc.

The aqueous dispersions obtainable with the process of the present invention, in particular those indicated in claim 1, have a specific conductivity, determined at the temperature of 25° C., higher than 100 µS/cm, preferably higher than 300 µS/cm.

The dispersions obtained with the process of the present invention can be then formulated with noionic, anionic, cationic, amphoteric surfactants; with organic or inorganic compounds and/or fillers, for example, of inorganic type; with solvents; viscosifying agents; biocides; resins, for example, acrylic, silicone, polyamidoimidic resins; polyethylenglycol and other known additives of the prior art.

As said, with the process of the present invention concentrated dispersions of fluoropolymers can be prepared substantially free from fluorinated anionic surfactants, preferably without the formation of significant amounts of coagula, generally <0.1% by weight, preferably <0.01% by weight, still more preferably <0.005% by weight, referred to the fluoropolymer weight.

Optionally, the fluoropolymer dispersions obtained with the invention process substantially free from fluorinated anionic surfactant can be additioned of cation exchange resins to substantially reduce the present cations. Also in this optional step, preferably salts of the same kind as those above mentioned for the invention process are added. Also in this case the final dispersion must satisfy the above mentioned filtration test, the dispersion being filterable on a 180 micrometer net and successively on a 10 micrometer net.

The following Examples illustrate with non limitative purposes the present invention.

EXAMPLES

The percentages reported in the Examples are percentages by weight.

Determination of the Average Particle Diameter in the Latex

The average particle diameter is measured by an instrument based on laser light diffusion, in particular on Photon Correlation Spectroscopy, equipped with Brookhaven correlator model 2030 AT and Argon Laser light source having a wave length of 514.5 nm by Spectra-Physics. The latex samples to be measured are diluted with water filtered at 0.2 µm on Millipore filter. The scattering measurement is carried out at room temperature (20° C.) at an angle of 90°. The latex particle diameter is obtained by the cumulant method.

Determination of the Dry Product Content (Polymer) in the Polymerization Latex 20 grams of latex are weighed in a glass beaker and placed in a stove to dry for 1 hour at 150° C. The latex dry content is obtained from the formula:

Dry product %=weight after drying/latex initial weight *100.

Determination of the Polymer and of the Nonionic Surfactant Content in the Concentrated Dispersions About 1 gram of concentrated dispersion is weighed in an aluminum shuttle and dried in a stove for 1 hour at 105° C. The shuttle is weighed and introduced in a muffle at the temperature of 400° C. for 10 minutes (sintering). At the end the shuttle is weighed again.

The polymer content of the concentrated dispersion is obtained from the formula:

$$\text{Polymer \%} = \frac{\text{weight after sintering}}{\text{initial dispersion weight}} * 100$$

The nonionic surfactant content of the concentrated dispersion is obtained from the formula:

$$\text{surfactant \%} = \frac{\text{weight after drying} - \text{weight after sintering}}{\text{initial dispersion weight}} * 100$$

PFOA Determination

The quantitative determination of the PFOA content in the dispersion is carried out by the method described in "Encyclopedia of Industrial Chemistry Analysis", vol. 1, pages 339–340, Interscience Publishers, New York, N.Y., 1971, and in EP-A 194,690.

PFOA is converted into methyl ester and the ester content gaschromatografically analyzed. The method sensitivity limit is of 1 ppm.

Sulphate Determination

The sulphate determination is carried out by ionic chromatography, using a Dionex® AS-9HC column and as eluent sodium carbonate 12 mM/sodium bicarbonate 5 mM.

Ammonium Determination

The ammonium ion is determined by colorimetry, using the Nessler reactant, according to the method described in "Metodi analitici per le acque", 1994, IRSA, Determinazione azoto ammoniacale No. 4010/D.

Determination of the Cloud Point (CP) of a Nonionic Surfactant

The cloud point is determined according to the standard EN 1890 Method A, at concentration 1% w/w in water of the nonionic surfactant.

Treatment in Batch of the Dispersion with the Anionic Exchange Resin 250 ml of dispersion are introduced in a 400 ml glass becker and put under moderate stirring at the rate of 250 rpm, by a two-blade mechanical stirrer having a total length of 3 cm and placed at a distance equal to about 1 cm from the becker bottom. Under stirring, the anionic exchange resins are introduced in an amount equal to 5% by weight with respect to the dispersion. To avoid the formation of resin clots in the dispersion, these are pretreated with a solution at 1% by weight of nonionic surfactant (Triton® X100). The liquid in excess is carefully removed before the resin use. When the resin dispersion is over, the system is maintained under stirring for 4 hours or for a longer time as described in the Examples. At the end the dispersion is filtered and the content of the residual fluorinated anionic surfactant is determined.

Filtration Test

After the treatment with the anionic exchanger, the recovered dispersion, about 250 ml, is transferred in a cylindrical polyethylene vessel, having height equal to 12 cm and diameter equal to 6 cm, equipped on the bottom with a seat for introducing a circular section nylon filter having diameter of 3 cm with a mesh of 180µ, capable to retain the anionic exchange resins.

The time employed by the charged dispersion volume to pass through the filter is measured.

During the operation the system is kept under stirring by a glass rod.

The dispersion after filtration through the 180µ net, is collected in a beaker and is transferred into a cylindrical polyethylene vessel, having height equal to 12 cm and diameter equal to 6 cm, equipped on the bottom with a seat for inserting a circular section polypropylene filter having a diameter of 3 cm, with mesh of 10µ.

The time employed by the dispersion to cross the filter is measured.

The dispersion satisfies the test when there are the following conditions together:

the time necessary to let pass the dispersion volume through the filter in the first filtration (180 micron mesh) is lower than 10 seconds, preferably lower than 5 seconds;

the time necessary to let pass the dispersion volume through the filter of the second filtration (10 micron mesh) is lower than 90 seconds.

Stability to Shear 300 ml of dispersion are placed in a Waring model laboratory blender having 1 liter volume beaker. The dispersion is subjected to strong stirring at 20,000 rpm. The time necessary to determine the dispersion coagulation under said conditions is determined.

Specific Conductivity

The determination was performed on a Crison mod. 525 conductimeter at a temperature of 25° C.

EXAMPLE 1

Preparation of the Fluoropolymer Dispersion by Emulsion Polymerization

EXAMPLE 1-a 11 grams of ammonium perfluorooctanoate in aqueous solution at a concentration 100 g/liter and 31 liters of carefully degassed demineralized water are fed into a 50 liter autoclave equipped with a mechanical stirrer and previously put under vacuum. 140 grams of paraffin with softening point in the range 52° C.–54° C. were also previously introduced in the reactor. The autoclave is kept under mechanical stirring and is pressurized with TFE up to a pressure of 20 bar at a temperature of 68° C. At this point 500 ml of a solution of $(NH4)_2S_2O_8$ (APS) and disuccinic peroxide (DSAP) corresponding to 400 mg of APS and 2,000 mg of DSAP are fed into the autoclave.

When the pressure in the reactor has decreased of 0.5 bar, one starts to feed TFE by a compressor so to maintain a constant pressure of 20 bar inside the reactor. In the meantime the internal reactor temperature is increased up to 78° C. at a rate of 0.5° C./min. During the reaction 50.6 grams of the aqueous solution at 100 g/liter of ammonium perfluorooctanoate are fed into the autoclave. After 90 minutes, the TFE feeding is interrupted, when 15,800 grams of TFE have reacted, the reactor evacuated and cooled. The discharged latex has a solid content equal to about 30% w/w.

The average diameter of the primary polymer particles measured by Laser Light Scattering (LLS) is equal to 240 nm.

The PFOA content is 3,900 ppm with respect to the polymer.

EXAMPLE 1-b 360 g of ammonium perfluorooctanoate are added to 30 liters of carefully degassed demineralized water and the solution is fed into a 50 liter autoclave equipped with a mechanical stirrer and previously put under vacuum. 140 grams of paraffin with softening point in the range 52° C.–54° C. and 22 g of hexafluoropropene (HFP) were also previously introduced in the reactor. The autoclave is kept under mechanical stirring and is pressurized with TFE up to a pressure of 20 bar at a temperature of 75° C. At this point 500 ml of a $(NH4)_2S_2O_8$ (APS) solution corresponding to 2,500 mg of APS are fed into the autoclave.

When the pressure in the reactor has decreased of 0.5 bar, one starts to feed TFE by a compressor so to maintain a constant pressure of 20 bar inside the reactor. In the meantime the internal reactor temperature is increased up to 85° C. at a rate of 0.2° C./min. After 70 minutes, the TFE feeding is interrupted when 5,470 grams of TFE have reacted, the reactor evacuated and cooled. An aqueous dispersion containing 15% w/w of polymer is obtained. The polymer contains 0.4% by weight of HFP.

The diameter of the primary polymer particles measured by Laser Light Scattering (LLS) is equal to 80 nm.

The PFOA content is 66,000 ppm with respect to the polymer.

EXAMPLE 1-c 600 g of ammonium perfluorooctanoate are added to 30 liters of carefully degassed demineralized water and the solution is fed into a 50 liter autoclave equipped with a mechanical stirrer and previously put under vacuum. 140 grams of paraffin with softening point in the range 52° C.–54° C. and 15 g of hexafluoropropene (HFP) were also previously introduced in the reactor. The autoclave is kept under mechanical stirring and is pressurized with TFE up to a pressure of 20 bar at a temperature of 75° C. At this point 500 ml of a $(NH4)_2S_2O_8$ (APS) solution corresponding to 2,500 mg of APS are fed into the autoclave.

When the pressure in the reactor has decreased of 0.5 bar, one starts to feed TFE by a compressor so to maintain a constant pressure of 20 bar inside the reactor. In the meantime the internal reactor temperature is increased up to 85° C. at a rate of 0.2° C./min. After 70 minutes, the TFE feeding is interrupted, when 3,440 grams of TFE have reacted, the reactor evacuated and cooled. An aqueous dispersion containing 10% w/w of polymer is obtained. The polymer contains 0.4% by weight of HFP.

The diameter of the primary polymer particles measured by Laser Light Scattering (LLS) is equal to 50 nm.

The PFOA content is 170,000 ppm with respect to the polymer.

EXAMPLE 2-a

Obtainment of a Concentrated Particle Dispersion Having a Diameter of 240 nm (Example 1-a) via Clouding In a 30 liter thermostatable reactor 18,000 g of PTFE dispersion of the Example 1-a are introduced, having a solid content equal to 30% and a PFOA content equal to 3,900 ppm with respect to the polymer. 3,600 g of Triton® X100 having Cloud Point CP=67° C., at 25% by weight and 45 g of ammonium sulphate solution at 10% by weight are added to the dispersion.

The mixture is heated to 70° C. under stirring. When said temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool to room temperature and from the lower part of the reactor a concentrated dispersion is discharged, having a polymer content of 72% by weight and a Triton® X100 content equal to 2.6% by weight (3.6% with respect to the polymer). The dispersion contains furthermore 80 ppm of ammonium sulphate. The PFOA content referred to the polymer is equal to 625 ppm. The pH is regulated between 7 and 7.5 with $NH_3$.

EXAMPLE 2-b

Obtainment of a Concentrated Dispersion of Particles Having a Diameter of 80 nm (Example 1-b) via Clouding In a 30 liter thermostatable reactor 18,000 g of PTFE dispersion of the Example 1-b are introduced, having a solid content equal to 15% and a PFOA content equal to 66,000 ppm with respect to the polymer. 8,700 g of Triton® X100 having CP=67° C., at 25% by weight and 30 g of ammonium sulphate solution at 10% by weight are added to the dispersion.

The mixture is heated to 68° C. under stirring. When said temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool to room temperature and from the lower part of the reactor a concentrated dispersion is discharged, having a polymer content of 50.8% by weight and a Triton® X100 content equal to 5.3% by weight (10.4% with respect to the polymer). The dispersion contains furthermore 60 ppm of ammonium sulphate. The PFOA content referred to the polymer is equal to 4,500 ppm. The pH is regulated between 7 and 7.5 with $NH_3$.

EXAMPLE 2-c

Obtainment of a Concentrated Particle Dispersion Having a Diameter of 50 nm (Example 1-c) via Clouding In a 30 liter thermostatable reactor 18,000 g of PTFE dispersion of the Example 1-c are introduced, having a solid content equal to 10% and a PFOA content equal to 170,000 ppm with respect to the polymer. 8,700 g of Triton® X100 having CP=67° C., at 25% by weight and 30 g of ammonium sulphate solution at 10% by weight are added to the dispersion.

The mixture is heated to 68° C. under stirring. When said temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool to room temperature and from the lower part of the reactor a concentrated dispersion is discharged, having a polymer content of 44,7% by weight and a Triton® X100 content equal to 5.7% by weight (12.7% with respect to the polymer). The dispersion contains furthermore 70 ppm of ammonium sulphate. The PFOA content referred to the polymer is equal to 7,200 ppm. The pH is regulated between 7 and 7.5 with $NH_3$.

EXAMPLE 2-d

Obtainment of a Concentrated Particle Dispersion Having Diameter of 240 nm (Example 1-a) via Ultrafiltration 30 liters of the dispersion of the Example 1-a are additioned of 1800 g of Triton® X100 at 25% by weight. The dispersion is concentrated in an ultrafiltration plant with tubular membranes of molecular cut of 200,000 dalton up to a concentration 65.5% by weight of PTFE. The obtained dispersion contains 2.8% by weight of Triton® X100 on the dispersion and 2,770 ppm of PFOA referred to the polymer. The pH is regulated between 7.0 and 7.5 with $NH_3$.

EXAMPLE 2-e

Obtainment of a Concentrated Bimodal Particle Dispersion Having Diameter of 240 nm (Example 1-a) in Admixture with Particles Having Diameter of 50 nm (Example 2-c) via Ultrafiltration 30 liters of the dispersion of the Example 1-a are additioned of 4.5 liters of the dispersion of the Example 2-c and of 750 g of Triton® X100 at 25% by weight.

The mixture contains 20% by weight of the particles of the Example 2-c with respect to the total polymer weight. The dispersion is concentrated in an ultrafiltration plant with tubular membranes of molecular cut equal to 200,000 dalton up to a concentration of 65.5% by weight of PTFE. The obtained dispersion contains 2.8% by weight of Triton® X100 on the dispersion and 3,300 ppm of PFOA referred to the polymer weight. The ammonium sulphate content, referred to the dispersion, is lower than 20 ppm. The pH is regulated between 7.0 and 7.5 with $NH_3$.

EXAMPLE 3 (COMPARATIVE)

Starting from the dispersion obtained in the Example 1-a a 250 ml sample containing 20% by weight of PTFE, 5% by weight of Triton® X100 referred to the polymer, is prepared, by addition of an aqueous solution of Triton® X100. The pH is regulated between 7.0 and 7.5 with $NH_3$. The PFOA content, referred to the polymer, is equal to 3,900 ppm.

The treatment on resins is carried out as described in the general part. The anionic exchange resin Amberjet® 4400 in the $OH^-$ form (Rohm & Haas) is used.

At the end of the treatment one filters as described in the above filtration test. The time necessary for the first filtration is lower than 5 seconds, that for the second filtration is lower than 30 seconds.

The PFOA content, referred to the polymer, is lower than 5 ppm.

The Example is summarized in Table 1.

EXAMPLE 3A (COMPARATIVE)

The example 3 (comparative) is repeated but by using the anionic exchange resin IRA 402 in the $OH^-$ form (Rohm & Haas) by contact with a solution 1 N of NaOH and subsequent washing with water.

The same results of the Example 3 (comparative) are obtained.

The Example is summarized in Table 1.

EXAMPLE 4 (COMPARATIVE)

Starting from the dispersion obtained in the Example 2-b a 250 ml sample is prepared, by addition of water, containing 20% by weight of PTFE, 10.4% by weight of Triton® X100 referred to the polymer. The pH is regulated between 7.0 and 7.5 with $NH_3$. The PFOA content, referred to the polymer, is 4,500 ppm.

The treatment on resins is carried out as described in the general part. The anionic exchange resin Amberjet® 4400 in the $OH^-$ form (Rohm & Haas) is used.

At the end of the treatment one filters as described in the above filtration test. The time necessary for the first filtration is lower than 5 seconds, that for the second filtration is lower than 30 seconds.

The PFOA content, referred to the polymer, is lower than 5 ppm.

The Example is summarized in Table 1.

EXAMPLE 4A

Starting from the dispersion obtained in the Example 2-c a 250 ml sample containing 20% by weight of PTFE, 12.7% by weight of Triton® X100 referred to the polymer and 0.1% by weight of $K_2SO_4$, referred to the dispersion weight, is prepared by addition of an aqueous solution of $K_2SO_4$. The PFOA content, referred to the polymer, is 7,200 ppm. The dispersion pH is between 7 and 7.5.

The treatment on resins is carried out as described in the general part. The anionic exchange resin Amberjet® 4400 in the OH⁻ form (Rohm & Haas) is used.

At the end of the treatment one filters as described in the above filtration test. The time necessary for the first filtration is lower than 5 seconds, that for the second filtration is lower than 30 seconds. On the 10 micrometer filter no coagula are observed. The PFOA content, referred to the polymer, is lower than 5 ppm.

The Example is summarized in Table 1.

EXAMPLE 4B

Starting from the dispersion obtained in the Example 2-d a 250 ml sample containing 30% by weight of PTFE, 4.3% by weight of Triton® X100 referred to the polymer and 0.02% by weight of $Na_2SO_4$, referred to the dispersion, is prepared by addition of an aqueous solution of $Na_2SO_4$. The PFOA content, referred to the polymer, is equal to 2,770 ppm. The dispersion pH is between 7 and 7.5. Specific conductivity was 460 µs/cm.

The treatment on resins is carried out as described in the general part. The anionic exchange resin Amberjet® 4400 in the OH⁻ form (Rohm & Haas) is used.

At the end of the treatment one filters as described in the above filtration test. The time necessary for the first filtration is lower than 5 seconds, that for the second filtration is lower than 30 seconds. On the 10 micrometer filter no coagula are observed. Specific conductivity was 780 µs/cm. The PFOA content, referred to the polymer, is lower than 5 ppm.

The Example is summarized in Table 1.

EXAMPLE 5

Starting from the dispersion obtained in the Example 2-c a 250 ml sample containing 40% by weight of PTFE, 12.7% by weight of Triton® X100 referred to the polymer and 0.1% by weight of $K_2SO_4$, referred to the dispersion weight, is prepared by addition of an aqueous solution of $K_2SO_4$. The PFOA content, referred to the polymer, is 7,200 ppm. The dispersion pH is between 7 and 7.5. Before treatment specific conductivity was 1530 µs/cm.

The treatment on resins is carried out as described in the general part. The anionic exchange resin Amberjet® 4400 in the OH⁻ form (Rohm & Haas) is used.

At the end of the treatment one filters as described in the above filtration test. The time necessary for the first filtration is lower than 5 seconds, that for the second filtration is lower than 60 seconds. On the 10 micrometer filter no coagula are observed. Specific conductivity was 1350 µs/cm. The PFOA content, referred to the polymer, is lower than 5 ppm.

The Example is summarized in Table 1.

EXAMPLE 5A (COMPARATIVE)

The Example 5 is repeated, by omitting the salt addition but by adding a volume of water equal to that of the $K_2SO_4$ solution of the Example 5. The pH is between 7.0 and 7.5.

At the end of the treatment on resins (8 hours) the dispersion shows a remarkable air incorporation and is no longer handleable. One filters as described in the above filtration test. After 600 seconds it is observed that the amount of recovered filtrate is very small and negligible, whereby the second filtration has not been carried out.

The Example is summarized in Table 1.

EXAMPLE 5B (COMPARATIVE)

The Example 5A (comparative) is repeated, but by correcting the dispersion pH to the 9.3 value by addition of $NH_3$.

At the end of the treatment on resins (8 hours) the dispersion shows a remarkable air incorporation and is no longer handleable. One filters as described in the above filtration test. After 600 seconds it is observed that the amount of recovered filtrate is very small and negligible, whereby the second filtration has not been carried out.

The Example is summarized in Table 1.

EXAMPLE 5C (COMPARATIVE)

The Example 5A (comparative) is repeated, but correcting the dispersion pH to the 9.3 value by addition of NaOH.

At the end of the treatment on resins (8 hours) the dispersion shows a remarkable air incorporation and is no longer handleable. One filters as described in the above filtration test. After 600 seconds it is observed that the amount of recovered filtrate is very small and negligible, whereby the second filtration has not been carried out.

The Example is summarized in Table 1.

EXAMPLE 6

Starting from the dispersion obtained in the Example 2-b a 250 ml sample containing 50% by weight of PTFE, 10.4% by weight of Triton® X100 referred to the polymer and 0.1% by weight of $K_2SO_4$, referred to the dispersion weight, is prepared, by addition of an aqueous solution of $K_2SO_4$. The PFOA content, referred to the polymer, is equal to 4,500 ppm. The dispersion pH is between 7 and 7.5.

The treatment on resins is carried out as described in the general part. The anionic exchange resin Amberjet® 4400 in the OH⁻ form (Rohm & Haas) is used.

At the end of the treatment one filters as described in the above filtration test. The time necessary for the first filtration is lower than 5 seconds, that for the second filtration is 60 seconds. On the 10 micrometer filter no coagula are observed. The PFOA content, referred to the polymer, is lower than 5 ppm.

The Example is summarized in Table 1.

EXAMPLE 6A (COMPARATIVE)

The Example 6 is repeated, by omitting the addition of the salt but by adding a water volume equal to that of the $K_2SO_4$ solution of the Example 6. The pH is between 7.0 and 7.5.

At the end of the treatment on resins (8 hours) the dispersion shows a remarkable air incorporation and is no longer handleable. One filters as described in the above filtration test. After 600 seconds it is observed that the amount of recovered filtrate is very small and negligible. The dispersion does not satisfy the test.

The Example is summarized in Table 1.

EXAMPLE 6B (COMPARATIVE)

Example 6A (comparative) is repeated but by using as anionic exchange resin IRA 402 in the OH⁻ form (Rohm & Haas).

The same results of the Example 6A (comparative) are obtained.

The Example is summarized in Table 1.

EXAMPLE 7

Starting from a mixture of the dispersions obtained in the Examples 2-d and 2-e a 250 ml sample containing 60% by weight of PTFE, 4.3% by weight of Triton® X100 referred to the polymer and 0.05% by weight of $KNO_3$, referred to the dispersion, is prepared, by addition of an aqueous solution of $KNO_3$. The polymer particle content of the Example 1-c (diameter equal to 50 nm) is equal to 15% by weight with respect to the total polymer. The PFOA content, referred to the polymer, is equal to 3,200 ppm. The dispersion pH is between 7 and 7.5. Specific conductivity was 1620 µs/cm.

The treatment on resins is carried out as described in the general part. The anionic exchange resin Amberjet® 4400 in OH⁻ form (Rohm & Haas) is used.

At the end of the treatment one filters as described in the above filtration test. The time necessary for the first filtration is lower than 5 seconds, that for the second filtration is 30 seconds. On the 10 micrometer filter no coagula are observed. Specific conductivity was 930 µs/cm. The PFOA content, referred to the polymer, is lower than 5 ppm.

The Example is summarized in Table 1.

EXAMPLE 7A (COMPARATIVE)

The Example 7 is repeated, by omitting the addition of the salt but by adding a volume of water equal to that of the $KNO_3$ solution of the Example 7. The pH is between 7.0 and 7.5.

The PFOA content, referred to the polymer, is 190 ppm.
The Example is summarized in Table 1.

EXAMPLE 8

Starting from the dispersion obtained in the Example 2-e a 250 ml sample containing 60% by weight of PTFE, 4.3% by weight of Triton® X100 referred to the polymer and 0.05% by weight of NaCl, referred to the dispersion, is prepared, by addition of an aqueous solution of NaCl. The polymer particle content of the Example 1-c (diameter equal to 50 nm) is equal to 20% by weight with respect to the total polymer. The PFOA content, referred to the polymer, is equal to 3,300 ppm. The dispersion pH is between 7 and 7.5.

The treatment on resins as described in the general part is carried out. The anionic exchange resin Amberjet® 4400 in OH⁻ form (Rohm & Haas) is used.

At the end of the treatment one filters as described in the above filtration test. The time necessary for the first filtration is lower than 5 seconds, that for the second filtration is 40 seconds. On the 10 micrometer filter no coagula are observed. The PFOA content, referred to the polymer, is lower than 5 ppm.

The Example is summarized in Table 1.

EXAMPLE 8A (COMPARATIVE)

The Example 8 is repeated, by omitting the addition of the salt but by adding a volume of water equal to that of the NaCl solution of the Example 8. The pH is between 7.0 and 7.5.

The PFOA content, referred to the polymer, is 190 ppm.
The Example is summarized in Table 1.

EXAMPLE 9

Starting from the dispersion obtained in the Example 2-e a 250 ml sample containing 63% by weight of PTFE, 4.3% by weight of Triton® X100 referred to the polymer and 0.05% by weight of $KNO_3$, referred to the dispersion, is prepared, by addition of an aqueous solution of $KNO_3$. The polymer particle content of the Example 1-c (diameter equal to 50 nm) is equal to 20% by weight with respect to the total polymer. The PFOA content, referred to the polymer, is equal to 3,300 ppm. The dispersion pH is between 7 and 7.5.

The treatment on resins is carried out as described in the general part. The anionic exchange resin Amberjet® 4400 in OH⁻ form (Rohm & Haas) is used.

At the end of the treatment one filters as described in the above filtration test. The time necessary for the first filtration is lower than 5 seconds, that for the second filtration is 45 seconds. On the 10 micrometer filter no coagula are observed. The PFOA content, referred to the polymer, is lower than 5 ppm.

The Example is summarized in Table 1.

EXAMPLE 9A (COMPARATIVE)

The Example 9 is repeated, by omitting the addition of the salt but by adding a volume of water equal to that of the $KNO_3$ solution of the Example 9. The pH is between 7.0 and 7.5.

The PFOA content, referred to the polymer, is 200 ppm.
The Example is summarized in Table 1.

EXAMPLE 10

Starting from the dispersion obtained in the Example 2-d a 250 ml sample containing 65% by weight of PTFE, 4.3% by weight of Triton® X100 referred to the polymer and 0.02% by weight of $Na_2SO_4$, referred to the dispersion, is prepared, by addition of an aqueous solution of $Na_2SO_4$. The PFOA content, referred to the polymer, is equal to 2,770 ppm. The dispersion pH is between 7 and 7.5.

Specific conductivity of the resulting dispersion was found to be 570 µS/cm.

The treatment on resins is carried out as described in the general part. The anionic exchange resin Amberjet® 4400 in OH⁻ form (Rohm & Haas) is used.

At the end of the treatment one filters as described in the above filtration test. The time necessary for the first filtration is lower than 5 seconds, that for the second filtration is 60 seconds. On the 10 micrometer filter no coagula are observed. The PFOA content, referred to the polymer, is lower than 5 ppm.

Specific conductivity of the resulting dispersion was found to be 740 µS/cm.

To the obtained dispersion an aqueous solution of Triton® X100 is added in such amount to obtain a sample at 60% by weight of PTFE and at 3% by weight of Triton® X100 referred to the dispersion (5% by weight with respect to the polymer). The stability to shear is measured with the above method; it is 560 seconds.

The Example is summarized in Table 1.

EXAMPLE 10A (COMPARATIVE)

The Example 10 is repeated, by omitting the addition of the salt but by adding a volume of water equal to that of the $Na_2SO_4$ solution of the Example 10. The pH is between 7.0 and 7.5.

The PFOA content, referred to the polymer, is 150 ppm.
The Example is summarized in Table 1.

EXAMPLE 11

Starting from a mixture of the dispersions obtained in the Examples 2-d and 2-e, a 250 ml sample containing 65% by weight of PTFE, 4.3% by weight of Triton® X100 referred to the polymer and 0.05% by weight of $KNO_3$, referred to the dispersion, is prepared, by addition of an aqueous solution of $KNO_3$. The polymer particle content of the Example 1-c (diameter equal to 50 nm) is equal to 5% by weight with respect to the total polymer. The PFOA content, referred to the polymer, is equal to 2,900 ppm. The dispersion pH is between 7 and 7.5.

The treatment on resins is carried out as described in the general part. The anionic exchange resin Amberjet® 4400 in $OH^-$ form (Rohm & Haas) is used.

At the end of the treatment one filters as described in the above filtration test. The time necessary for the first filtration is lower than 5 seconds, that for the second filtration is 50 seconds. On the 10 micrometer filter no coagula are observed. The PFOA content, referred to the polymer, is lower than 5 ppm.

The Example is summarized in Table 1.

EXAMPLE 11A (COMPARATIVE)

The Example 11 is repeated, by omitting the addition of the salt but by adding a volume of water equal to that of the $KNO_3$ solution of the Example 11. The pH is between 7.0 and 7.5.

The PFOA content, referred to the polymer, is 160 ppm.
The Example is summarized in Table 1.

EXAMPLE 12

Starting from a mixture of the dispersions obtained in the Examples 2-d and 2-e, a 250 ml sample containing 65% by weight of PTFE, 4.3% by weight of Triton® X100 referred to the polymer and 0.05% by weight of $KNO_3$, referred to the dispersion, is prepared, by addition of an aqueous solution of $KNO_3$. The polymer particle content of the Example 1-c (diameter equal to 50 nm) is equal to 15% by weight with respect to the total polymer. The PFOA content, referred to the polymer, is equal to 3,200 ppm. The dispersion pH is between 7 and 7.5.

The treatment on resins is carried out as described in the general part. The anionic exchange resin Amberjet® 4400 in $OH^-$ form (Rohm & Haas) is used.

At the end of the treatment one filters as described in the above filtration test. The time necessary for the first filtration is lower than 5 seconds, that for the second filtration is 50 seconds. On the 10 micrometer filter no coagula are observed. The PFOA content, referred to the polymer, is lower than 5 ppm.

The Example is summarized in Table 1.

EXAMPLE 12A (COMPARATIVE)

The Example 12 is repeated, by omitting the addition of the salt but by adding a volume of water equal to that of the $KNO_3$ solution of the Example 12. The pH is between 7.0 and 7.5.

In the filtration process it is observed that the time necessary for the first filtration is 110 seconds, that for the second filtration is 300 seconds, wherefore the dispersion does not satisfy the test. The PFOA content, referred to the polymer, is 220 ppm.

The Example is summarized in Table 1.

EXAMPLE 13

Starting from a mixture of the dispersions obtained in the Examples 2-a and 2-b, a 250 ml sample containing 65% by weight of PTFE, 4.2% by weight of Triton® X100 referred to the polymer and 0.05% by weight of $KNO_3$, referred to the dispersion, is prepared, by addition of an aqueous solution of $KNO_3$. The polymer particle content of the Example 1-b (diameter equal to 80 nm) is equal to 15% by weight with respect to the total polymer. The PFOA content, referred to the polymer, is equal to 1,000 ppm. The dispersion pH is between 7 and 7.5.

The treatment on resins is carried out as described in the general part. The anionic exchange resin Amberjet® 4400 in $OH^-$ form (Rohm & Haas) is used.

At the end of the treatment one filters as described in the above filtration test. The time necessary for the first filtration is lower than 5 seconds, that for the second filtration is 60 seconds. On the 10 micrometer filter no coagula are observed. The PFOA content, referred to the polymer, is lower than 5 ppm.

The Example is summarized in Table 1.

EXAMPLE 13A (COMPARATIVE)

The Example 13 is repeated, by omitting the addition of the salt but by adding a volume of water equal to that of the $KNO_3$ solution of the Example 13. The pH is between 7.0 and 7.5.

In the filtration process it is observed that the time necessary for the first filtration is 90 seconds, that for the second filtration is >600 seconds. The dispersion does not satisfy the test.

The Example is summarized in Table 1.

EXAMPLE 14

Starting from a mixture of the dispersions obtained in the Examples 2-a and 2-c, a 250 ml sample containing 68% by weight of PTFE, 4.0% by weight of Triton® X100 referred to the polymer and 0.05% by weight of $K_2SO_4$, referred to the dispersion, is prepared, by addition of an aqueous solution of $K_2SO_4$. The polymer particle content of the Example 1-c (diameter equal to 50 nm) is equal to 5% by weight with respect to the total polymer. The PFOA content, referred to the polymer, is equal to 950 ppm. The dispersion pH is between 7 and 7.5.

The treatment on resins is carried out as described in the general part. The anionic exchange resin Amberjet® 4400 in $OH^-$ form (Rohm & Haas) is used.

At the end of the treatment one filters as described in the above filtration test. The time necessary for the first filtration is lower than 5 seconds, that for the second filtration is 70 seconds. On the 10 micrometer filter no coagula are observed. The PFOA content, referred to the polymer, is lower than 5 ppm.

The Example is summarized in Table 1.

EXAMPLE 14A (COMPARATIVE)

The Example 14 is repeated, by omitting the addition of the salt but by adding a volume of water equal to that of the $K_2SO_4$ solution of the Example 14. The pH is between 7.0 and 7.5.

In the filtration process it is observed that the time necessary for the first filtration is 130 seconds, that for the second filtration is >600 seconds. The dispersion does not satisfy the test.

The Example is summarized in Table 1.

EXAMPLE 15

Starting from the dispersion obtained in the Example 2-a, a 250 ml sample containing 70% by weight of PTFE, 3.6% by weight of Triton® X100 referred to the polymer and 0.05% by weight of $K_2SO_4$, referred to the dispersion, is prepared, by addition of an aqueous solution of $K_2SO_4$. The PFOA content, referred to the polymer, is equal to 625 ppm. The dispersion pH is between 7 and 7.5. Specific conductivity was 1260 µs/cm.

The treatment on resins is carried out as described in the general part. The anionic exchange resin Amberjet® 4400 in OH⁻ form (Rohm & Haas) is used.

At the end of the treatment one filters as described in the above filtration test. The time necessary for the first filtration is lower than 5 seconds, that for the second filtration is 80 seconds. On the 10 micrometer filter no coagula are observed. Specific conductivity was 1470 µs/cm. The PFOA content, referred to the polymer, is lower than 5 ppm.

The Example is summarized in Table 1.

EXAMPLE 15A (COMPARATIVE)

The Example 15 is repeated, by omitting the addition of the salt but by adding a volume of water equal to that of the $K_2SO_4$ solution of the Example 15. The pH is between 7.0 and 7.5.

In the filtration process it is observed that the time necessary for the first filtration is 150 seconds, that for the second filtration is >600 seconds. The dispersion does not satisfy the test.

The Example is summarized in Table 1.

EXAMPLE 16

To 200 g of the dispersion obtained after filtration in the Example 12, an aqueous solution of $(NH_4)_2SO_4$ at 10% is added in such amount to have a salt percentage of 0.02% by weight on the total of the dispersion. The % polymer content remains substantially unchanged.

The dispersion is transferred in a 250 ml polyethylene bottle and 2% by weight of cation exchange resin Dowex®MAC 3 is added. The bottle is hermetically sealed and let rotate on rolls around its own axis for 30 minutes at the rate of 50 rev/min.

The dispersion at the end of the treatment is filterable again on a 180 micron nylon net with a filtration time lower than 5 seconds and subsequently on a 10 micron polypropylene net with a filtration time of 35 seconds.

The residual potassium ion, determined by atomic absorption, is lower than 1 ppm.

TABLE 1

Examples 3–15 comp: The Table reports the dispersion dry product; the average particle diameters (D1, D2), in the case of bimodal dispersions the percent by weight of the smallest particles with respect to the total polymer weight (% D2); the percentage of nonionic surfactant calculated on the polymer; the used resin: A = Amberjet ® 4400 OH; B = IRA 402; the salt and the respective amount; the filtration times in seconds on 180 µm and 10 µm filter; the residual PFOA amount. In the Table * = the pH was brought to 9.3 with ammonia; ° = the pH was brought to 9.3 with NaOH

| Ex. | Dry prod. % | D1 nm | D2 nm | % D2 | Surf. % by wt | Resin type | Salt | Salt % by wt | S 180 µm | S 10 µm | PFOA ppm |
|---|---|---|---|---|---|---|---|---|---|---|---|
| 3 comp | 20 | 240 | — | — | 5 | A | — | — | <5 | <30 | <5 |
| 3A comp | 20 | 240 | — | — | 5 | B | — | — | <5 | <30 | <5 |
| 4 comp | 20 | 80 | — | — | 10.4 | A | — | — | <5 | <30 | <5 |
| 4A | 20 | 50 | — | — | 12.7 | A | $K_2SO_4$ | 0.1 | <5 | <30 | <5 |
| 4B | 30 | 240 | — | — | 4.3 | A | $Na_2SO_4$ | 0.02 | <5 | <30 | <5 |
| 5 | 40 | 50 | — | — | 12.7 | A | $K_2SO_4$ | 0.1 | <5 | 60 | <5 |
| 5A comp | 40 | 50 | — | — | 12.7 | A | — | — | >600 | — | — |
| 5B comp* | 40 | 50 | — | — | 12.7 | A | — | — | >600 | — | — |
| 5C comp ° | 40 | 50 | — | — | 12.7 | A | — | — | >600 | — | — |
| 6 | 50 | 80 | — | — | 10.4 | A | $K_2SO_4$ | 0.1 | <5 | 60 | <5 |
| 6A comp | 50 | 80 | — | — | 10.4 | A | — | — | >600 | — | — |
| 6B comp | 50 | 80 | — | — | 10.4 | B | — | — | >600 | — | — |
| 7 | 60 | 240 | 50 | 15 | 4.3 | A | $KNO_3$ | 0.05 | <5 | 30 | <5 |
| 7A comp | 60 | 240 | 50 | 15 | 4.3 | A | — | — | — | — | 190 |
| 8 | 60 | 240 | 50 | 20 | 4.3 | A | NaCl | 0.05 | <5 | 40 | <5 |
| 8A comp | 60 | 240 | 50 | 20 | 4.3 | A | — | — | — | — | 220 |
| 9 | 63 | 240 | 50 | 20 | 4.3 | A | $KNO_3$ | 0.05 | <5 | 45 | <5 |
| 9A comp | 63 | 240 | 50 | 20 | 4.3 | A | — | — | — | — | 200 |
| 10 | 65 | 240 | — | — | 4.3 | A | $Na_2SO_4$ | 0.02 | <5 | 60 | <5 |
| 10A comp | 65 | 240 | — | — | 4.3 | A | — | — | — | — | 150 |
| 11 | 65 | 240 | 50 | 5 | 4.3 | A | $KNO_3$ | 0.05 | <5 | 50 | <5 |
| 11A Comp | 65 | 240 | 50 | 5 | 4.3 | A | — | — | — | — | 160 |
| 12 | 65 | 240 | 50 | 15 | 4.3 | A | $KNO_3$ | 0.05 | <5 | 50 | <5 |

TABLE 1-continued

Examples 3–15 comp: The Table reports the dispersion dry product; the average particle diameters (D1, D2), in the case of bimodal dispersions the percent by weight of the smallest particles with respect to the total polymer weight (% D2); the percentage of nonionic surfactant calculated on the polymer; the used resin: A = Amberjet ® 4400 OH; B = IRA 402; the salt and the respective amount; the filtration times in seconds on 180 μm and 10 μm filter; the residual PFOA amount. In the Table * = the pH was brought to 9.3 with ammonia; ° = the pH was brought to 9.3 with NaOH

| Ex. | Dry prod. % | D1 nm | D2 nm | % D2 | Surf. % by wt | Resin type | Salt | Salt % by wt | S 180 μm | S 10 μm | PFOA ppm |
|---|---|---|---|---|---|---|---|---|---|---|---|
| 12A comp | 65 | 240 | 50 | 15 | 4.3 | A | — | — | 110 | 300 | 220 |
| 13 | 65 | 240 | 80 | 10 | 4.2 | A | $KNO_3$ | 0.05 | <5 | 60 | <5 |
| 13A comp | 65 | 240 | 80 | 10 | 4.2 | A | — | — | 90 | >600 | — |
| 14 | 68 | 240 | 50 | 5 | 4.0 | A | $K_2SO_4$ | 0.05 | <5 | 70 | <5 |
| 14A comp | 68 | 240 | 50 | 5 | 4.0 | A | — | — | 130 | >600 | — |
| 15 | 70 | 240 | — | — | 3.6 | A | $K_2SO_4$ | 0.05 | <5 | 80 | <5 |
| 15A comp | 70 | 240 | — | — | 3.6 | A | — | — | 150 | >600 | — |

The invention claimed is:

1. A process to substantially remove the fluorinated anionic surfactants comprising the following steps:
   a) addition to a fluoropolymer dispersion comprising polymers chosen from the following groups:
   tetrafluoroethylene (TFE) homopolymer;
   homopolymers and copolymers based on CTFE;
   VDF/HFP fluoroelastomers, containing TFE and/or vinylethers selected between perfluoroalkyl vinylethers and/or perfluoroalkoxyalkyl vinylethers; optionally containing hydrogenated olefins;
   TFE and/or VDF amorphous and/or crystalline fluoropolymers containing dioxole rings having 5–7 atoms; or
   copolymers of tetrafluoroethylene (TFE) with comonomers having at least one unsaturation of ethylene type, said copolymers comprising hydrogenated and/or fluorinated comonomers, the comonomer amount being lower than 3% by weight;
   of a nonionic surfactant, in an amount in the range 1.5%–25% by weight referred to the fluoropolymer weight;
   b) addition to the dispersion of a salt, soluble in water and not giving precipitates in the dispersion under the use conditions;
   c) contact of the dispersion with a basic anionic exchanger;
   d) separation of the dispersion from the basic anionic exchanger;
   before step d) the dispersion is filtered on a 180 micrometer net and successively on a 10 micrometer net according to the following:
   a dispersion aliquot of about 250 ml, obtained after the treatment with the anionic exchanger, is transferred into a cylindrical vessel equipped on the bottom with a circular section filter having a diameter of 3 cm with 180 micron mesh; the time necessary to filter the dispersion volume from the resins is measured;
   the dispersion after filtration is transferred into cylindrical vessel equipped on the bottom with a circular section filter having a diameter of 3 cm, with 10 micron mesh; the time necessary to allow the whole dispersion amount to cross the filter, is measured;
   the time necessary to let pass the dispersion volume through the filter with 180 micron mesh is lower than 10 seconds;
   the time necessary to let pass the dispersion volume through the 10 micron mesh filter is lower than 90 seconds.

2. A process according to claim 1, wherein the salt used in step b) is an alkaline metal salt in an amount ranging from 50 ppm to 1% by weight referred to the dispersion weight.

3. A process according to claim 1, wherein step c) is carried out by a continuous or discontinuous process.

4. A process according to claim 1, wherein fluoropolymer dispersions having concentration from 20% to 75% on the dry product are used.

5. A process according to claim 4, wherein fluoropolymer dispersions are used having:
   concentrations higher than 65% by weight and containing particles having an average diameter from 180 nm to 400 nm;
   concentrations higher than 50% by weight and containing particles having an average diameter higher than 70 nm,
   concentrations higher than 40% by weight and containing particles having an average diameter of 30 nm, up to 70 nm;
   concentrations higher than 30% by weight and containing particles having an average diameter between 10 nm and 30 nm.

6. A process according to claim 1 wherein fluoropolymer dispersions comprise polytetrafluoroethylene (PTFE) or TFE copolymers.

7. A process according to claim 1, wherein the nonionic surfactants used in step a) are polyethoxylated alcohols and polyethoxylated alkylphenols, optionally containing one or more propylene oxide units.

8. A process according to claim 7, wherein the surfactants are selected from the following:

t-$C_8H_{17}$—$C_6H_4$—$(OCH_2CH_2)_{9-10}OH$;

sec-$C_{12}H_{25}$—$(OCH_2CH_2)_{10,1}OH$;

iso-$C_{13}H_{27}$—$OCH_2CH_2CH_2)$—$(OCH_2CH_2)_{10}$—OH;

iso-C$_{13}$H$_{27}$,—(OCH$_2$CH$_2$)$_{10}$—OH;

iso-C$_{13}$H$_{27}$,—(OCH$_2$CH$_2$)$_8$—OH.

9. A process according to claim 1, wherein the coagulum amount is <0.1% by weight referred to the fluoropolymer weight.

10. Aqueous dispersions of fluoropolymers substantially free of anionic fluorinated surfactants according to claim 1.

11. Aqueous dispersions according to claim 10 wherein the fluoropolymers are chosen from TFE homopolymers or copolymers of tetrafluoroethylene (TFE) with comonomers having at least one unsaturation of ethylene type, said copolymers comprising hydrogenated and/or fluorinated comonomers, the comonomer amount being lower than 3% by weight.

12. Aqueous dispersions according to claim 10, having a content of fluorinated surfactants lower than 100 ppm.

13. Aqueous dispersions according to claim 10, wherein the specific conductivity is higher than 100 µS/cm.

14. The process of claim 1 wherein the homopolymers and copolymers based on CTFE comprise PCTFE and E/CTFE copolymer.

15. The process of claim 1 wherein the VDF/HFP fluoroelastomers comprise hydrogenated olefins selected from ethylene or propylene.

16. The process of claim 1 wherein the TFE and/or VDF amorphous and/or crystalline fluoropolymers are obtained by copolymerization with (per)fluorodioxoles or with dienic monomers giving dioxole rings by cyclization.

17. The process of claim 1 wherein the copolymers of tetrafluoroethylene (TEE) with comonomers having at least one unsaturation of ethylene type comprising lower than 1% by weight comonomer.

18. The process of claim 1 wherein the nonionic surfactant comprises 2%–10% by weight of the fluoropolymer.

19. The process of claim 1 wherein the time necessary to let pass the dispersion volume through the filter with 180 micron mesh is lower than 5 seconds.

20. The process of claim 2 wherein the alkaline metal salt is a potassium or sodium salt.

21. The process of claim 2 wherein the alkaline metal salt is in an amount ranging from 100 ppm to 1,000 ppm.

22. The process of claim 5 wherein the fluoropolymer dispersions have concentrations higher than 65% by weight and comprise particles having an average diameter from 200 nm to 300 nm.

23. The process of claim 5 wherein the fluoropolymer dispersions have concentrations higher than 65% by weight and comprise particles having an average diameter from 220 nm to 280 nm.

24. The process of claim 1 wherein the fluoropolymer dispersions comprises an average particle diameter between 180 nm and 400 nm.

25. The process of claim 1 wherein the fluoropolymer dispersions comprises an average particle diameter between 200 nm and 300 nm.

26. The process of claim 1 wherein the fluoropolymer dispersions comprises an average particle diameter between 220 nm to 280 nm.

27. The process of claim 1 wherein the fluoropolymer dispersions comprises an average particle diameter between 10 nm and 100 nm.

28. The process of claim 1 wherein the fluoropolymer dispersions comprises an average particle diameter between 20 nm and 80 nm.

29. The process of claim 1 wherein the fluoropolymer dispersions comprises an average particle diameter between 30 nm and 70 nm.

30. The process of claim 9 wherein the coagulum amount is <0.01% by weight.

31. The process of claim 9 wherein the coagulum amount is <0.005% by weight.

32. The aqueous dispersions of claim 11 wherein the comonomer amount is lower than 1% by weight.

33. The aqueous dispersions of claim 12 wherein the content of fluorinated surfactants is lower than 50 ppm.

34. The aqueous dispersions of claim 12 wherein the content of fluorinated surfactants is lower than 5 ppm.

35. The aqueous dispersions of claim 13 wherein the specific conductivity is higher than 300 µS/cm.

* * * * *